(12) United States Patent
Sinha et al.

(10) Patent No.: US 11,084,578 B2
(45) Date of Patent: Aug. 10, 2021

(54) REDUNDANT DRIVE TRAIN FOR PYLON MOUNTED ROTORS

(71) Applicant: Kitty Hawk Corporation, Palo Alto, CA (US)

(72) Inventors: Pranay Sinha, Sunnyvale, CA (US); Damon Vander Lind, Alameda, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 0 days.

(21) Appl. No.: 17/066,944

(22) Filed: Oct. 9, 2020

(65) Prior Publication Data

US 2021/0107665 A1 Apr. 15, 2021

Related U.S. Application Data

(60) Provisional application No. 62/912,872, filed on Oct. 9, 2019.

(51) Int. Cl.
*B64C 29/00* (2006.01)
*B64C 39/12* (2006.01)
(Continued)

(52) U.S. Cl.
CPC .......... *B64C 29/0033* (2013.01); *B60L 50/64* (2019.02); *B60L 53/00* (2019.02); *B64C 13/48* (2013.01); *B64C 27/82* (2013.01); *B64C 39/12* (2013.01); *B64D 27/02* (2013.01); *B64D 27/24* (2013.01); *B64D 27/26* (2013.01); *B64D 31/06* (2013.01); *G05D 1/101* (2013.01); *B60L 2200/10* (2013.01); *B64C 2027/8209* (2013.01); *B64D 2027/026* (2013.01); *B64D 2027/264* (2013.01)

(58) Field of Classification Search
CPC .......... B64C 29/0033; B64C 2201/024; B64C 2201/042; B64C 2201/108; B64C 27/28; B64C 27/12; B64C 27/16
USPC ........................................................ 244/7 A
See application file for complete search history.

(56) References Cited

U.S. PATENT DOCUMENTS 3,167,273 A * 1/1965 Alvarez Calderon ...................... B64C 29/0033 244/12.4
3,185,408 A * 5/1965 Higgins .............. B64C 29/0033 244/7 R (Continued)

FOREIGN PATENT DOCUMENTS

| EP | 3461742 A1 * | 4/2019 | ........ B64C 29/0016 |
| WO | WO-9105704 A1 * | 5/1991 | ............ B64D 35/00 |
| WO | 2019056052 | 3/2019 | |

OTHER PUBLICATIONS

Author Unknown, Aerial Ridesharing at Scale, Uber Elevate, Oct. 3, 2019, Retrieved from http://web.archive.org/web/20191003070118/https://www.uber.com/us/en/elevate/uberair/.

(Continued)

*Primary Examiner* — Christopher P Ellis
(74) *Attorney, Agent, or Firm* — Van Pelt, Yi & James LLP

(57) ABSTRACT

A pylon is coupled to a wing. A tiltrotor, having a range of motion, is coupled to the wing via the pylon, such that the tiltrotor is aft of the wing. The tiltrotor includes a redundant drivetrain, including a plurality of motors and a plurality of motor controllers, that drives one or more blades included in the tiltrotor.

10 Claims, 14 Drawing Sheets

(51) Int. Cl.
| | |
|---|---|
| *B64D 27/26* | (2006.01) |
| *B64C 27/82* | (2006.01) |
| *B64D 27/02* | (2006.01) |
| *G05D 1/10* | (2006.01) |
| *B64C 13/48* | (2006.01) |
| *B64D 27/24* | (2006.01) |
| *B60L 53/00* | (2019.01) |
| *B60L 50/64* | (2019.01) |
| *B64D 31/06* | (2006.01) |

(56) References Cited

U.S. PATENT DOCUMENTS

| | | | | |
|---|---|---|---|---|
| 4,746,081 A | * | 5/1988 | Mazzoni | B64C 39/12 244/89 |
| 6,227,481 B1 | * | 5/2001 | Fenny | B64C 29/0033 244/56 |
| 6,247,667 B1 | * | 6/2001 | Fenny | B64C 29/0033 244/56 |
| 6,655,631 B2 | * | 12/2003 | Austen-Brown | B64D 25/00 244/12.4 |
| 9,643,720 B2 | * | 5/2017 | Hesselbarth | B64D 27/26 |
| 9,694,906 B1 | * | 7/2017 | Sadek | B64C 39/024 |
| 10,144,503 B1 | * | 12/2018 | Vander Lind | B64C 29/0025 |
| 10,479,482 B1 | * | 11/2019 | Kuentzel | B64C 27/39 |
| 10,569,889 B1 | * | 2/2020 | Western | B64D 17/80 |
| D892,710 S | * | 8/2020 | Vander Lind | D12/344 |
| 2006/0266881 A1 | * | 11/2006 | Hughey | B64C 27/08 244/17.23 |
| 2009/0250549 A1 | | 10/2009 | Wiggerich | |
| 2010/0025526 A1 | * | 2/2010 | Lawrence | B64C 39/024 244/17.23 |
| 2011/0024555 A1 | * | 2/2011 | Kuhn, Jr. | B64C 29/0033 244/17.25 |
| 2011/0031355 A1 | * | 2/2011 | Alvarez Calderon F. | B64C 39/08 244/7 R |
| 2013/0231208 A1 | * | 9/2013 | Buono | B64C 27/12 475/5 |
| 2014/0248168 A1 | * | 9/2014 | Chantriaux | B64C 27/14 417/410.1 |
| 2014/0339372 A1 | * | 11/2014 | Dekel | B64C 39/024 244/7 R |
| 2015/0136897 A1 | * | 5/2015 | Seibel | B64C 29/0033 244/6 |
| 2015/0232178 A1 | * | 8/2015 | Reiter | B64C 3/385 244/7 A |
| 2015/0314867 A1 | * | 11/2015 | Razroev | B64C 29/0075 244/119 |
| 2015/0344134 A1 | * | 12/2015 | Cruz Ayoroa | B64C 39/12 244/48 |
| 2015/0360774 A1 | * | 12/2015 | Covington | B64C 29/0033 244/7 R |
| 2016/0023527 A1 | * | 1/2016 | Dietrich | B64D 35/02 244/2 |
| 2016/0101853 A1 | * | 4/2016 | Toppenberg | B64C 29/0033 244/7 A |
| 2017/0217600 A1 | * | 8/2017 | Regev | B64C 15/00 |
| 2017/0240274 A1 | * | 8/2017 | Regev | B64D 35/08 |
| 2018/0257761 A1 | * | 9/2018 | Oldroyd | B64D 31/06 |
| 2018/0281949 A1 | | 10/2018 | Mitchell | |
| 2018/0334251 A1 | * | 11/2018 | Karem | B64C 29/0033 |
| 2018/0339773 A1 | * | 11/2018 | McCullough | B64C 39/08 |
| 2019/0009895 A1 | * | 1/2019 | Tu | B64C 29/0025 |
| 2019/0009899 A1 | * | 1/2019 | Tian | B64C 39/04 |
| 2019/0009900 A1 | * | 1/2019 | Chavez | B64C 27/26 |
| 2019/0016451 A1 | * | 1/2019 | Ehinger | F02C 7/36 |
| 2019/0031337 A1 | * | 1/2019 | McCullough | B64D 27/26 |
| 2019/0061936 A1 | * | 2/2019 | North | B64C 29/0033 |
| 2019/0063574 A1 | * | 2/2019 | Kopp | F16H 37/122 |
| 2019/0100303 A1 | * | 4/2019 | Campbell | B64C 27/26 |
| 2019/0135427 A1 | * | 5/2019 | Robertson | B64D 27/24 |
| 2019/0256194 A1 | | 8/2019 | Vander Lind | |
| 2019/0337629 A1 | * | 11/2019 | Gilliland | B64C 27/28 |
| 2020/0010187 A1 | * | 1/2020 | Bevirt | B64C 29/0033 |
| 2020/0023964 A1 | * | 1/2020 | Valente | B64C 39/024 |
| 2020/0062383 A1 | * | 2/2020 | Kim | B64C 3/385 |
| 2020/0070969 A1 | * | 3/2020 | Campbell | B64C 27/50 |
| 2020/0140079 A1 | * | 5/2020 | Campbell | B64C 39/024 |
| 2020/0164995 A1 | * | 5/2020 | Lovering | B64D 31/06 |
| 2020/0180756 A1 | * | 6/2020 | Kapeter | B64C 39/024 |
| 2020/0307811 A1 | * | 10/2020 | Shang | B64D 33/08 |
| 2020/0324885 A1 | * | 10/2020 | Bernard | B64C 29/02 |
| 2020/0333805 A1 | * | 10/2020 | English | B64C 29/0033 |
| 2020/0398982 A1 | * | 12/2020 | Valente | G05D 1/0858 |

OTHER PUBLICATIONS

Mark Moore, Vehicle Collaboration Strategy and Common Reference Models, Uber Elevate Transformative VTOL Workshop, Jan. 2018.

Bacchini et al., "Electric VTOL Configurations Comparison", Feb. 28, 2019 <URL: https://www.mdpi.com/2226-4310/6/3/26/pdf> pp. 1-19.

* cited by examiner

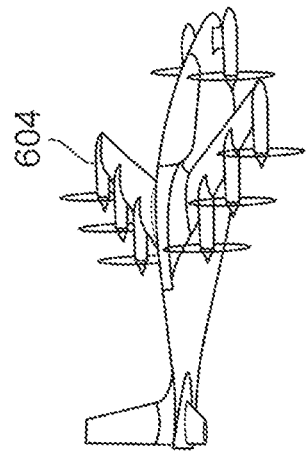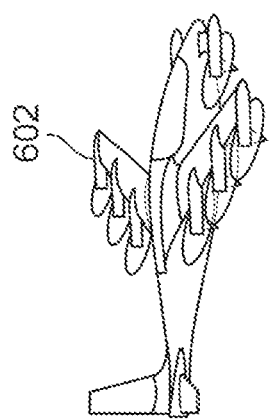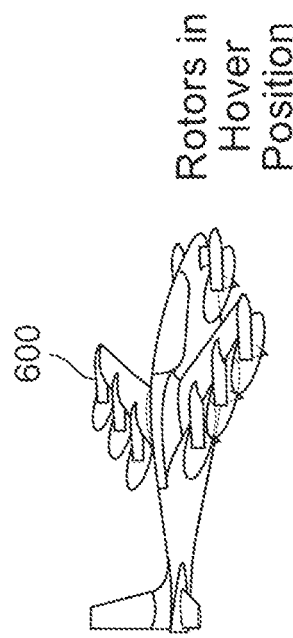
FIG. 6A — Prior Art

REDUNDANT DRIVE TRAIN FOR PYLON MOUNTED ROTORS

CROSS REFERENCE TO OTHER APPLICATIONS

This application claims priority to U.S. Provisional Patent Application No. 62/912,872 entitled FIXED WING AIRCRAFT WITH TILT ROTORS filed Oct. 9, 2019 which is incorporated herein by reference for all purposes.

BACKGROUND OF THE INVENTION

New types of aircraft are being developed which are capable of taking off and landing in dense urban areas, opening up new transportation pathways and bypassing gridlock on the roads. For example, Kitty Hawk Corporation is developing a new electric vertical takeoff and landing (eVTOL) tiltrotor which can take off and land in a footprint of roughly 30 ft.×30 ft. An early prototype has been manufactured and tested and further improvements to the vehicle's performance (e.g., improving safety and/or reducing mass) would be desirable.

BRIEF DESCRIPTION OF THE DRAWINGS

Various embodiments of the invention are disclosed in the following detailed description and the accompanying drawings.

FIG. 2B is a diagram illustrating a bottom view of an embodiment of boundary layer thicknesses with motors on.

FIG. 6A is a diagram illustrating an embodiment of a takeoff tilt change from hover position to cruise position.

DETAILED DESCRIPTION

Figure 1A:
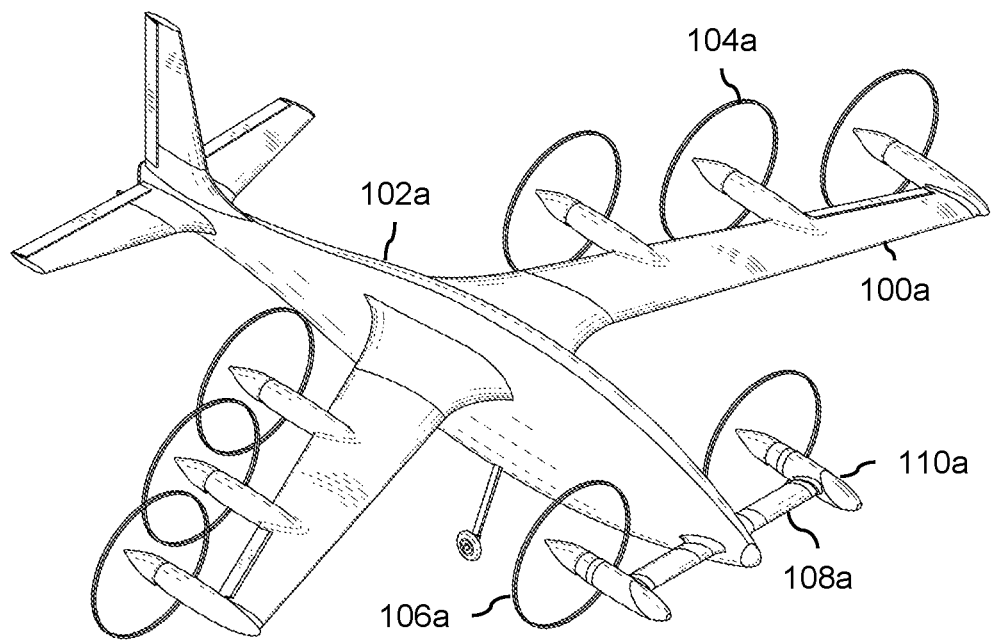
FIG. 1A is a perspective view diagram illustrating an embodiment of a forward swept, fixed wing vehicle with tilt rotors.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a redundant drivetrain system are described herein. In a redundant drive train, there are multiple drivetrains, including multiple motors and multiple motor controllers. As will be described in more detail below, redundant drivetrain systems may reduce the total drivetrain weight and in some cases permit the remaining operational drivetrain(s) to output at least some thrust from the propeller. In some embodiments, the system includes a pylon, where the pylon is coupled to a wing (e.g., a main wing or a canard) and a tiltrotor, where the tiltrotor has a range of motion, the tiltrotor is coupled to the wing via the pylon, such that the tiltrotor is aft of the wing, and the tiltrotor includes a redundant drivetrain, including a plurality of motors and a plurality of motor controllers, that drives one or more blades included in the tiltrotor.

First, an exemplary tiltrotor vehicle is described where initial prototypes used non-redundant drivetrains for each propeller or rotor. As will be described in more detail below, the uniqueness of the exemplary vehicle applied a unique set of constraints on the redundant drivetrain systems that could be used therein. It is noted that the redundant drivetrain system described herein may be used in other vehicles beyond the exemplary tiltrotor vehicle.

Figure 1B:
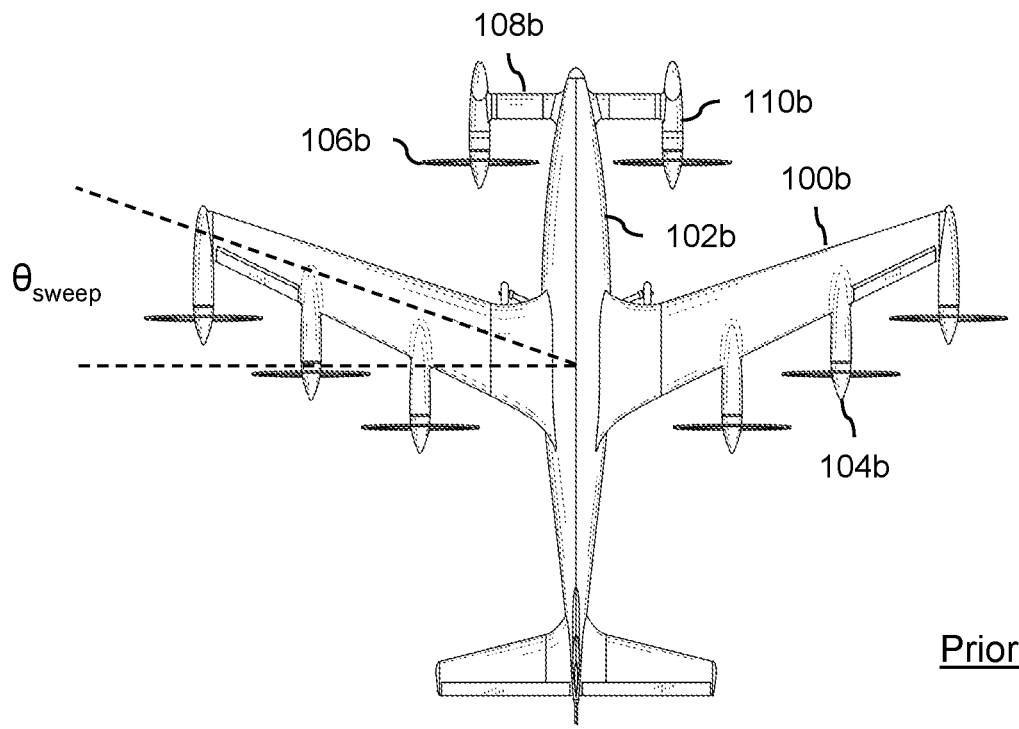
FIG. 1B is a top view diagram illustrating an embodiment of a forward swept, fixed wing vehicle with tilt rotors.

FIG. 1A is a perspective view diagram illustrating an embodiment of a forward swept, fixed wing vehicle with tilt rotors. FIG. 1B is a top view diagram illustrating an embodiment of a forward swept, fixed wing vehicle with tilt rotors. In the example shown, the main wing (100a and 100b) is a fixed wing which is attached to the fuselage (102a and 102b) in a fixed manner or position. The main wing is not, in other words, a tilt wing which is capable of rotating. The main wing (100a and 100b) is also forward swept (e.g., relative to the pitch axis). For example, the forward-sweep angle may be on the order of $\theta_{sweep}$ between 14° and 16° for aircraft embodiments with a canard (as shown here) or as high as 35° for aircraft embodiments without a canard.

In this example, the main wing (100a and 100b) has six rotors (104a and 104b) which are attached to the trailing edge of the main wing. Rotors or propellers in this configuration are sometimes referred to as pusher propellers (e.g., because the propellers are behind the wing and "push" the vehicle forward, at least when they are in their forward flight position). Forward flight mode is sometimes referred to herein as cruise mode. For clarity, these rotors on the main wing are sometimes referred to as the main wing rotors (e.g., to differentiate them from the rotors which are attached to the canard). Naturally, the number of rotors shown here is merely exemplary and is not intended to be limiting.

In addition to the six main wing rotors, there are two rotors (106a and 106b) which are attached to the canard (108a and 108b). These rotors are sometimes referred to as the canard rotors. The canard is thinner than the main wing, so unlike the main wing rotors, the canard rotors are attached to the distal ends of the canard as opposed to the trailing edge of the canard.

All of the rotors in this example are tilt rotors, meaning that they are capable of tilting or otherwise rotating between two positions. In the drawings shown here, the rotors are in a cruise (e.g., forward flight, backward facing, etc.) position. In this position, the rotors are rotating about the (e.g., substantially) longitudinal axes of rotation so that they provide (substantially) backward thrust. When the rotors are in this position, the lift to keep the tiltrotor vehicle airborne comes from the airflow over the main wing (100a and 100b) and the canard (108a and 108b). In this particular example, the rotational range of a tilt rotor ranges has a minimum angular position of approximately 0°-5° and a maximum angular position of approximately 90°-95°. This range is design and/or implementation specific.

The rotors can also be tilted down to be in a hover (e.g., vertical takeoff and landing, downward facing, etc.) position (not shown). In this second position, the rotors are rotating about (e.g., substantially) vertical axes of rotation so that they provide (substantially) downward thrust. In this configuration, the lift to keep the tiltrotor vehicle airborne comes from the downward airflow of the rotors.

Generally speaking, the tilt rotors, when oriented to output thrust substantially downward, permit the aircraft to perform vertical takeoff and landings (VTOL). This mode or configuration (e.g., with respect to the manner in which the aircraft as a whole is flown and/or with respect to the position of the tilt rotors specifically) is sometimes referred to as hovering. The ability to perform vertical takeoffs and landings permits the aircraft to take off and land in areas where there are no airports and/or runways. Once airborne, the tilt rotors (if desired) change position to output thrust (substantially) backwards instead of downwards. This permits the aircraft to fly in a manner that is more efficient for forward flight; this mode or configuration is sometimes referred to as cruising.

A canard is useful because it can stall first (e.g., before the main wing), creating a lot of pitching moments and not much loss of lift at stall whereas a main wing stall loses a lot of lift per change in pitching moment (e.g., causing the entire aircraft to drop or fall). Stalls are thus potentially more benign with a canard compared to without a canard. The canard stall behavior is particularly beneficial in combination with a swept forward wing, as the stall of the main wing can create an adverse pitching moment if at the wing root and can create large and dangerous rolling moments if at the wing tip. Furthermore, a canard can create lift at low airspeeds and increase $CL_{max}$ (i.e., maximum lift coefficient) and provides a strut to hold or otherwise attach the canard motors to.

In some embodiments, the pylons (110a and 110b) which are used to attach the rotors to the canard and/or main wing include some hinge and/or rotating mechanism so that the tilt rotors can rotate between the two positions shown. Any appropriate hinge mechanism may be used. For example, with ultralight aircraft, there are very stringent weight requirements and so a lightweight solution may be desirable. Alternatively, a fixed-tilt solution may also be used to meet very stringent weight requirements.

In some embodiments, the aircraft is designed so that the main wing (100a and 100b) and canard (108a and 108b) are able to provide sufficient lift to perform a glider-like landing if needed during an emergency. For example, some ultralight standards or specifications require the ability to land safely if one or more rotors fail and the ability to perform a glider-like landing would satisfy that requirement. One benefit to using a fixed wing for the main wing (e.g., as opposed to a tilt wing) is that there is no danger of the wing being stuck in the wrong position (e.g., a hover position) where a glider-like landing is not possible because of the wing position which is unsuitable for a glider-like landing.

Another benefit to a fixed wing with trailing edge mounted tilt rotors is stall behavior (or lack thereof) during a transition from hover position to cruise position or vice versa. With a tilt wing, during transition, the tilt wing's angle of attack changes which makes stalling an increased risk. A fixed wing with trailing edge mounted tilt rotors does not change the wing angle of attack (e.g., even if rotors are turned off/on or the tilt rotors are shifted). Also, this configuration both adds dynamic pressure and circulation over the main wing, which substantially improves the behavior during a transition (e.g., from hover position to cruise position or vice versa). In other words, the transition can be performed faster and/or more efficiently with a fixed wing with trailing edge mounted tilt rotors compared to a tilt wing (as an example).

Another benefit associated with fixed wing vehicle with tilt rotors (e.g., as opposed to a tilt wing) is that a smaller mass fraction is used for the tilt actuator(s). That is, multiple actuators for multiple tilt rotors (still) comprise a smaller mass fraction than a single, heavy actuator for a tilt wing. There are also fewer points of failure with tilt rotors since there are multiple actuators as opposed to a single (and heavy) actuator for the tilt wing. Another benefit is that a fixed wing makes the transition (e.g., between a cruising mode or position and a hovering mode or position) more stable and/or faster compared to a tilt wing design.

In some embodiments, the rotors are variable pitch propellers which have different blade pitches when the rotors are in the hovering position versus the cruising position. For example, different (ranges of) blade pitches may enable more efficient operation or flight when in the cruise position versus the hovering position. When the rotors are in a cruise position, putting the blade pitches into "cruising pitch" (e.g., on the order of 26°) enables low frontal area which is good for cruising (e.g., lower drag). When the rotors are in a hovering position, putting the blade pitches into a "hovering pitch" (e.g., on the order of 6°) enables high disc area which is good for hovering. To put it another way, one blade pitch may be well suited for cruising mode but not for hovering mode and vice versa. The use of variable pitch propellers enables better (e.g., overall) efficiency, resulting in less power consumption and/or increased flight range.

The following figures illustrate various benefits associated with the exemplary aircraft shown in FIGS. 1A and 1B.

Figure 2B:
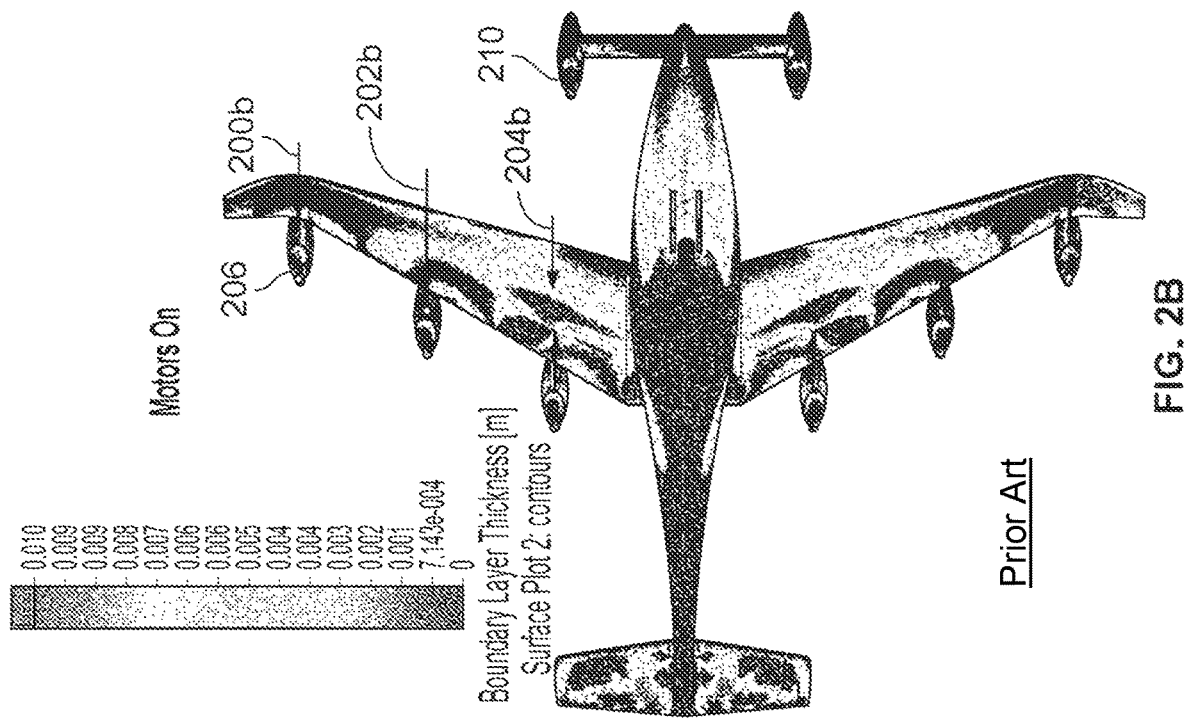
Figure 2A:
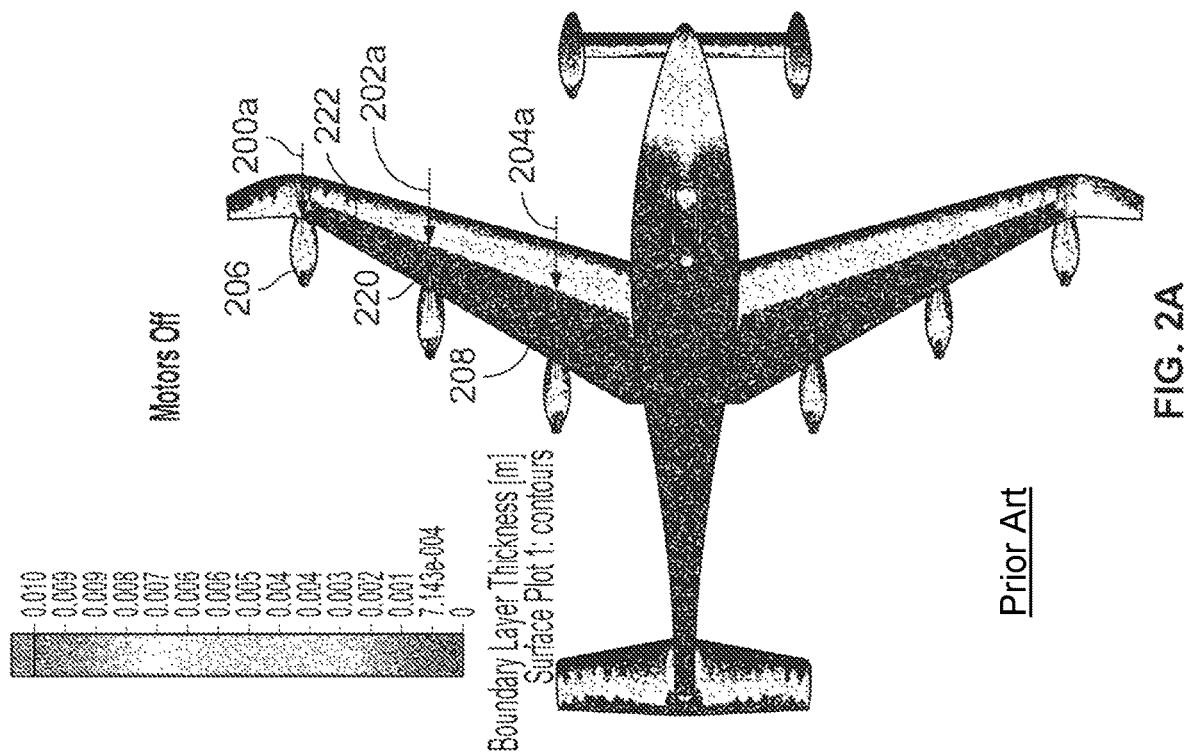
FIG. 2A is a diagram illustrating a bottom view of an embodiment of boundary layer thicknesses with the motors off.

FIG. 2A is a diagram illustrating a bottom view of an embodiment of boundary layer thicknesses with the motors off. In this example, laminar run lines 200a, 202a, and 204a illustrate laminar runs at various regions of the main wing. In this example, it is assumed that the aircraft is cruising (e.g., flying in a substantially forward direction). As in FIGS. 1A and 1B, the main wing rotors (206) are attached to the trailing edge of the main wing (208) in this embodiment. The next figure shows the boundary layer thicknesses with the rotors turned on.

FIG. 2B is a diagram illustrating a bottom view of an embodiment of boundary layer thicknesses with motors on. In this example, the motors are on and the rotors have an exit airflow velocity of 30 m/s. With the motors on, a low pressure region is created towards the aft of the wing which increases the laminar run on the main wing. See, for example, laminar run lines 200b, 202b, and 204b which correspond to laminar run lines 200a, 202a, and 204a from FIG. 2A. A comparison of the two sets illustrates that the laminar runs have increased for the first two locations (i.e., at 200a/200b and 202a/202b). The last location (i.e., 204a/204b) has only a slightly longer laminar run length due to interference from the canard rotors (210).

The drag from the main wing rotors (more specifically, the drag from the pylons which are used to attach the main wing rotors to the main wing) is hidden in the wake of the airflow coming off the main wing. See, for example FIG. 2A which more clearly shows that the pylons (220) are connected or otherwise attached behind most of the extent of laminar run (222). With the embodiment shown here, the pylons also get to keep some of the boundary layer thickness from the main wing, which means the pylons have lower drag per surface area. This improves the drag compared to some other alternate designs or configurations. The following figures describe this in more detail.

Figure 3A:
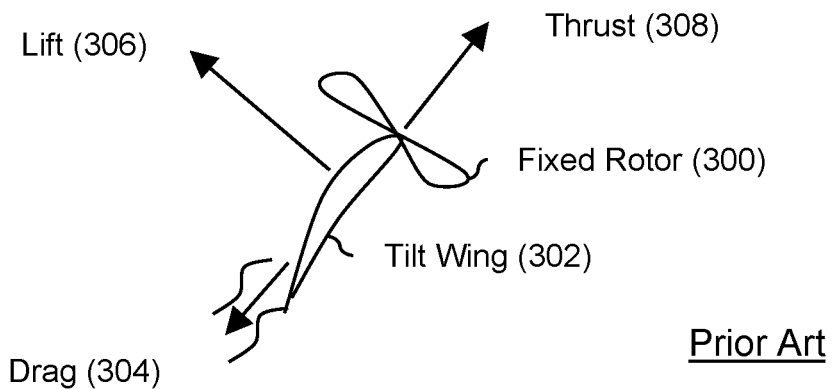
FIG. 3A is a diagram illustrating an example of a tilt wing configuration with corresponding lift vector, thrust vector, and drag.

FIG. 3A is a diagram illustrating an example of a tilt wing configuration with corresponding lift vector, thrust vector, and drag. In this example, a fixed rotor (300) is attached to a tilt wing (302) at a fixed position or angle. This is one alternate arrangement to the aircraft embodiment(s) described above. To direct the airflow produced by the fixed rotor (300) either backwards or downwards, the tilt wing (302) is rotated. As shown here, with this configuration, there is drag (304) at the trailing edge of the tilt wing, which is undesirable.

The lift (306) and thrust (308) for this configuration are also shown here, where the tilt wing is shown in the middle of a transition (e.g., between a cruising position and a hovering position). As shown here, the lift (306) and thrust (308) are substantially orthogonal to each other, which is inefficient. In other words, a tilt wing is inefficient during its transition.

Figure 3B:
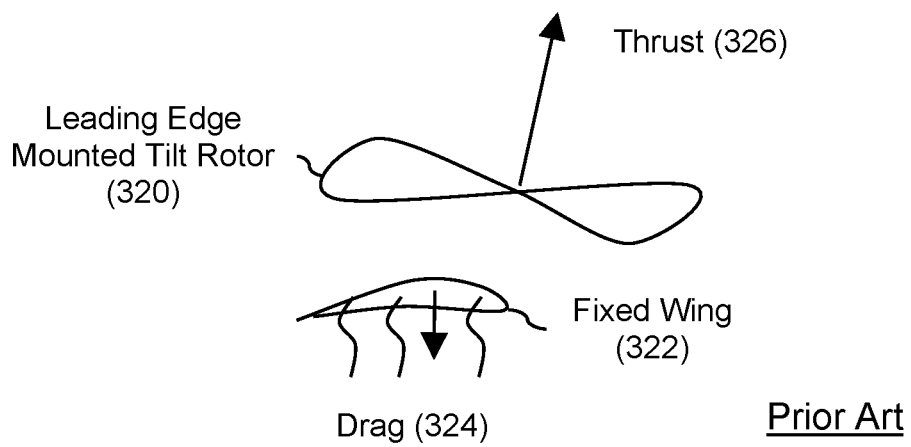
FIG. 3B is a diagram illustrating an example of a fixed wing configuration with a leading edge mounted tilt rotor and corresponding lift vector, thrust vector, and drag.

FIG. 3B is a diagram illustrating an example of a fixed wing configuration with a leading edge mounted tilt rotor and corresponding lift vector, thrust vector, and drag. In this example, a tilt rotor (320) is attached to the leading edge of a fixed wing (322). This is another alternate arrangement to the aircraft embodiment(s) described above. The corresponding drag (324) and thrust (326) for this arrangement are also shown. There is no useful lift produced with this configuration and therefore no lift vector is shown here.

Figure 3C:
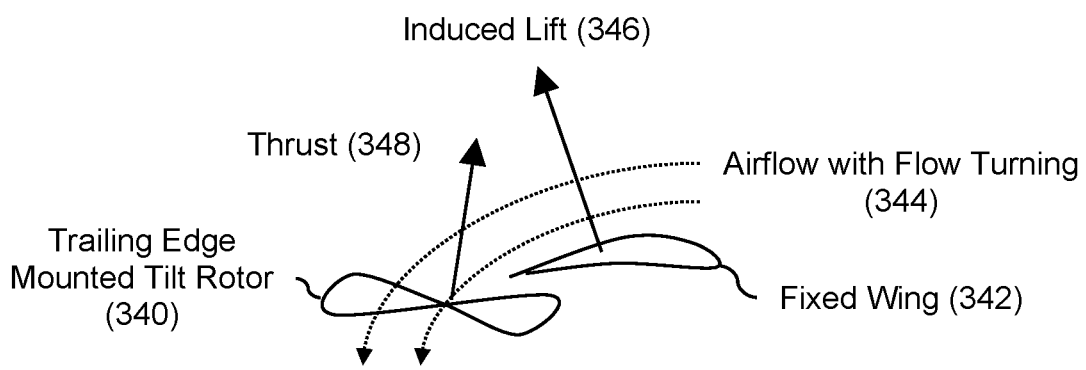
FIG. 3C is a diagram illustrating an embodiment of a fixed wing configuration with a trailing edge mounted tilt rotor and corresponding lift vector, thrust vector, and drag.

FIG. 3C is a diagram illustrating an embodiment of a fixed wing configuration with a trailing edge mounted tilt rotor and corresponding lift vector, thrust vector, and drag. In this example, the tilt rotor (340) is attached to the trailing edge of the fixed wing (342). In this configuration, the drag due to the trailing edge mounted tilt rotor (e.g., mostly due to its pylon, not shown) is hidden in the wake of the airflow coming off the main wing. As such, there is no drag (at least due to the tilt rotor (340)).

The position of the trailing edge mounted tilt rotor (340) relative to the fixed wing (342) also sucks air (344) over the fixed wing, after which the air turns or bends through the rotor and downwards. This flow turning over the wing generates a relatively large induced lift (346) which is shown here. The thrust vector (348) due to the rotors is also shown here. It is noted that the induced lift (346) and thrust (348) are substantially in the same direction (i.e., both are pointing substantially upwards) which is a more efficient arrangement, including during a transition. In other words, using a fixed wing with trailing edge mounted tilt rotors produces less drag and improved efficiency during a transition (e.g., due to the lift and thrust vectors which now point in substantially the same direction) compared to other rotor and wing arrangements. Note for example, drag 304 and drag 324 in FIG. 3A and FIG. 3B, respectively, and the orthogonal positions of lift 306 and thrust 308 in FIG. 3A.

The following figure illustrates an embodiment of flow turning in more detail.

Figure 4:
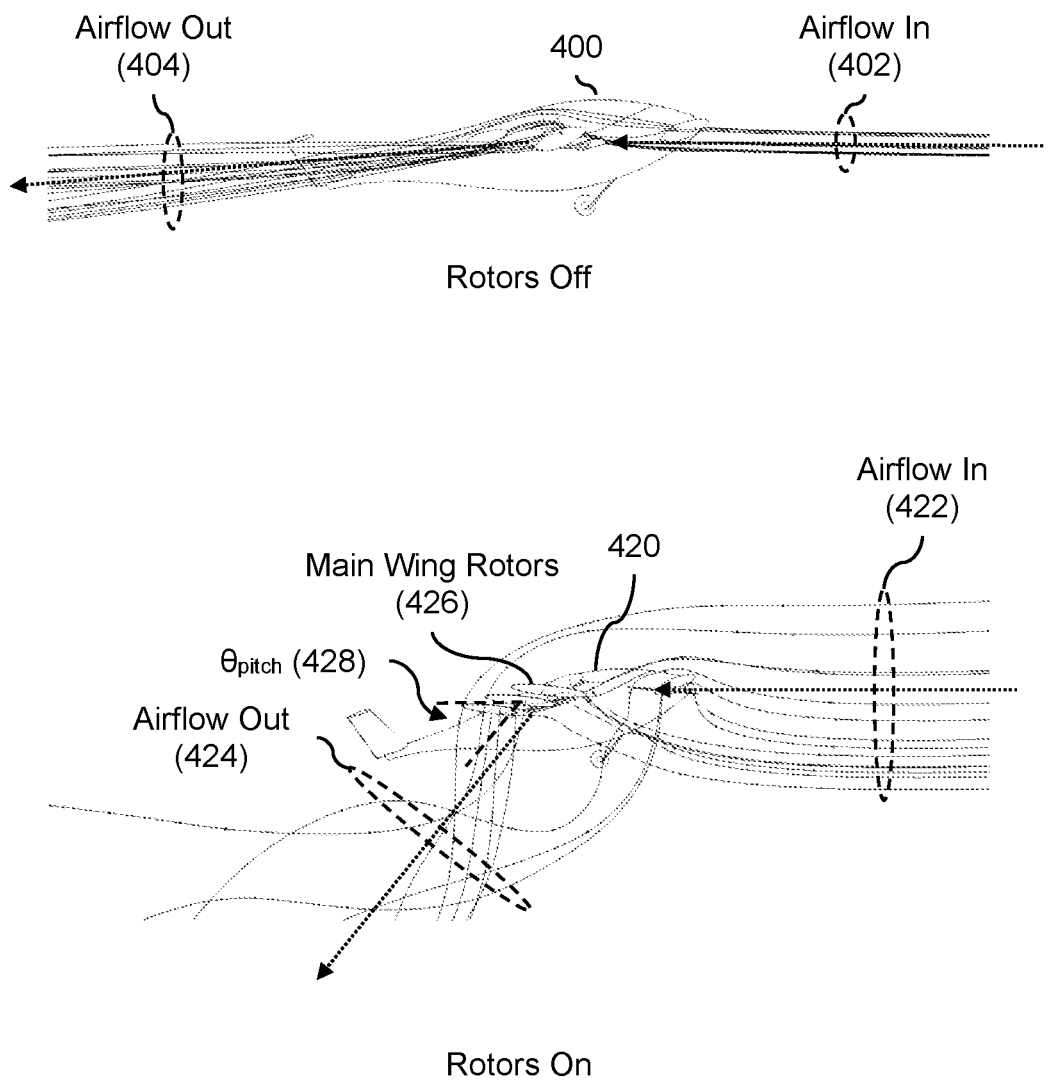
FIG. 4 is a diagram illustrating an embodiment of airflow produced when trailing edge mounted tilt rotors on a main wing are off.

FIG. 4 is a diagram illustrating an embodiment of airflow produced when trailing edge mounted tilt rotors on a main wing are off. In this example, a tiltrotor (400) is shown but with the main wing rotors turned off for comparison purposes. With the rotors off, the airflow in (402) and the airflow out (404) are moving in substantially the same direction. That is, the airflow does not turn (e.g., downwards) as it passes through the rotors.

Tiltrotor 420 shows the same vehicle as tiltrotor 400 except the rotors are turned on. In this example, the airflow in (422) and the airflow out (424) have noticeable different directions and there is noticeable turning or bending of the airflow as it passes through the rotors of the exemplary tiltrotor shown. As described above, this induces a noticeable lift, which is desirable because less power is consumed and/or the range of the tiltrotor increases.

In this example, the main wing rotors (426) are in the hovering position. As shown here, these rotors are slightly pitched or otherwise angled (e.g., with the tops of the main wing rotors pointing slightly forward and the bottoms pointing slightly backward). In this diagram, the amount of tilting is shown as $\theta_{pitch}$ (428) and in some embodiments is on the order of 90° of rotational range or movement (e.g., ~3° up from horizontal when in a cruise position (e.g., for minimum drag) and ~93° degrees down from horizontal when in a hover position which produces a rotational range of ~96°). Although this angling or pitching of the rotors is not absolutely necessary for flow turning to occur, in some embodiments the main wing rotors are angled or otherwise pitched to some degree in order to increase or otherwise optimize the amount of flow turning. In some embodiments, the canard rotors are similarly pitched. It is noted that tiltrotor 420 is shown in a nose up position and therefore the vertical axis (e.g., relative to the tiltrotor) is not perpendicular to the ground and/or frame of reference.

In some embodiments, the rotors (e.g., the main wing rotors and/or canard rotors) are rolled or otherwise angled slightly outward, away from the fuselage, when the rotors are in hovering position. In some embodiments, this roll (e.g., outward) is on the order of 10° for greater yaw authority.

In some embodiments, the main wing is tapered (e.g., the wing narrows going outward towards the tip) in addition to being forward swept. The following figures describe various wing and/or tail embodiments.

Figure 5:
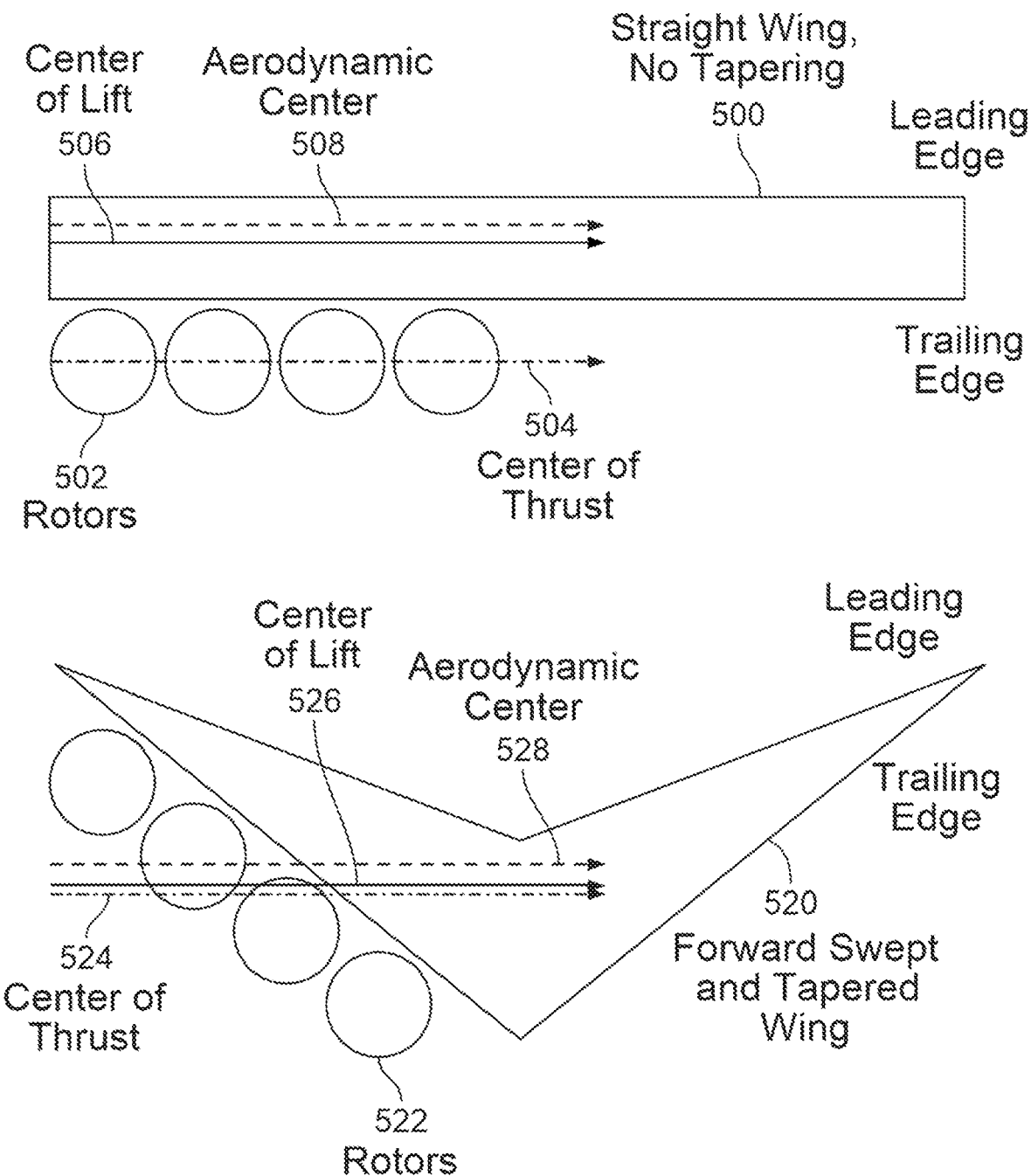
FIG. 5 is a diagram illustrating an embodiment of a forward swept and tapered wing and a straight wing for comparison.

FIG. 5 is a diagram illustrating an embodiment of a forward swept and tapered wing and a straight wing for comparison. In the example shown, wing 500 is a straight wing with no tapering (e.g., the wing is the same width from the center to the tip of the wing). Exemplary rotors (502) are shown at the trailing edge of the straight wing (500).

The center of thrust (504), indicated by a dashed and dotted line, is dictated by the placement or arrangement of the rotors and runs through the centers of the main wing rotors (502). For simplicity, the canard rotors are ignored in this example. The center of lift is based on the shape of the wing. For a rectangular wing such as wing 500, the center of lift (506), indicated by a solid line, runs down the center of the wing. Calculation of the aerodynamic center is more complicated (e.g., the aerodynamic center depends upon the cross section of the wing, etc.) and aerodynamic center 508, indicated by a dashed line, is exemplary and/or typical for this type of wing.

As shown here, the straight wing (500) and its corresponding arrangement of main wing rotors (502) produce a center of thrust (504) which is relatively far from both the center of lift (506) as well as the aerodynamic center. This separation is undesirable. More specifically, when the main wing rotors (502) are in hover position, if the center of thrust (504) is far from the center of lift (506), then the transition (e.g., in the context of the movement of the aircraft as a whole, such as switching from flying substantially upwards to substantially forwards or vice versa) would create very large moments and could overturn the vehicle or prevent acceleration or stability and/or require a massive and/or non-optimal propulsion system. In cruise, if the center of thrust (504) is far from the center of lift (506), it is not as important (e.g., since the thrust moments are both smaller and more easily balanced by aerodynamic moments), but it is still undesirable.

In contrast, the forward swept and tapered wing (520) and its corresponding arrangement of rotors (522) along the trailing edge produce a center of thrust (524), center of lift (526), and aerodynamic center (528) which are closer to each other. For example, the forward sweep of the wing brings the rotors forward to varying degrees. This causes the center of thrust to move forward (e.g., towards the leading edge and towards the other centers). The tapering of the wings prevents the aerodynamic center and center of lift from creeping forward too much (and more importantly, away from the center of thrust) as a result of the forward sweep. For example, with a forward swept wing with no tapering (not shown), the center of thrust would move forward approximately the same amount as the aerodynamic center and center of lift and would result in more separation between the three centers than is shown here with wing 520.

Some other benefits to a forward swept and tapered wing include better pilot visibility, and a better fuselage junction location with the main wing (e.g., so that the main wing spar can pass behind the pilot seat, not through the pilot). Furthermore, the taper reduces wing moments and puts the center of the thrust of the motors closer to the wing attachment to the fuselage, as referenced about the direction of flight, so there are less moments carried from wing to fuselage, a shorter tail boom (e.g., which reduces the weight of the aircraft), and improved pitch stability.

The following figures describe exemplary tilt transitions of the rotors between cruise position and hover position.

FIG. 6A is a diagram illustrating an embodiment of a takeoff tilt change from hover position to cruise position. In some embodiments, the exemplary tiltrotor performs this transition soon after taking off (e.g., substantially vertically). It is noted that this tilt transition is optional and the aircraft may fly entirely with the rotors in the hovering position (albeit with less than optimal performance). For example, this could be done if there is risk in the tilting action, and it would be better to take the action at a higher altitude.

Tiltrotor 600 shows the exemplary aircraft after it has performed a vertical takeoff. In this state shown here, the main wing rotors and canard rotors are in hover position (e.g., rotating about a substantially vertical axis of rotation so that the rotors generate substantially downward thrust).

The tiltrotor then transitions from an entirely upward direction of movement to a direction of movement with at least some forward motion with the rotors remaining in the hover position until the tiltrotor reaches some desired altitude at which to begin the transition (602). In other words, the vehicle transitions first, and then changes the tilt of the rotors. In one example, the altitude at which the tiltrotor begins the rotor tilt change from hover position to cruise position is an altitude which is sufficiently high enough for there to be recovery time in case something goes wrong during the transition. Switching the rotors between hover position and cruise position is a riskier time where the likelihood of something going wrong (e.g., a rotor failing, a rotor getting stuck, etc.) is higher. Although the tiltrotor may have systems and/or techniques in place for recovery (e.g., compensating for a rotor being out by having the remaining rotors output more thrust, deploy a parachute, etc.), these systems and/or techniques take time (i.e., sufficient altitude) to work.

From position 602, the tiltrotor flies substantially forward and moves the tilt rotors from a hover position (e.g., where thrust is output substantially downward) to a cruise position. Once in the cruise position 604, the rotors rotate about a substantially longitudinal axis so that they output backward thrust.

Figure 6B:
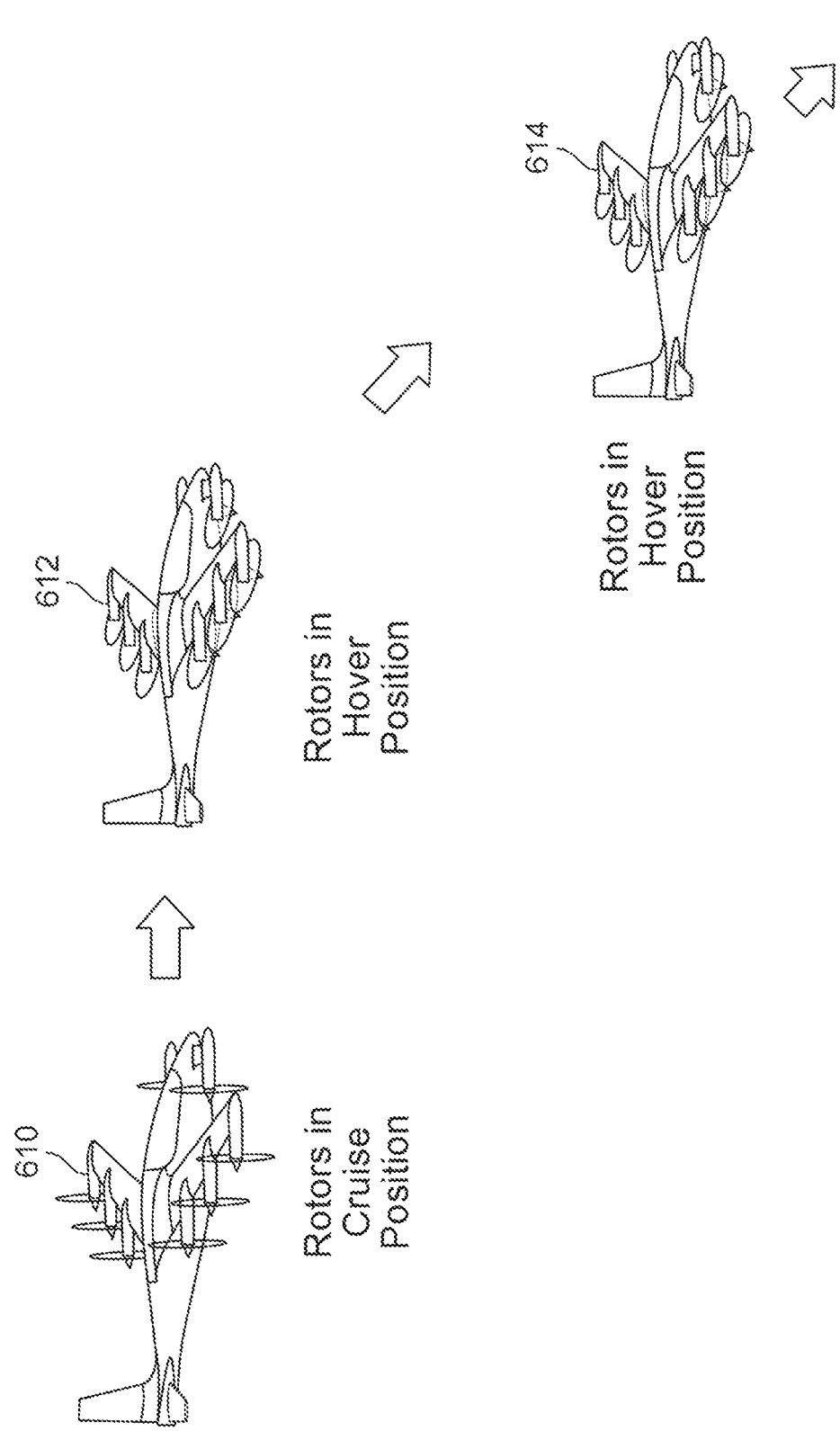
FIG. 6B is a diagram illustrating an embodiment of a landing tilt change from cruise position to hover position.

FIG. 6B is a diagram illustrating an embodiment of a landing tilt change from cruise position to hover position. For example, the exemplary tiltrotor may perform this transition before landing vertically. As with the previous transition, this transition is optional. For example, the exemplary tiltrotor can keep the tilt rotors in cruise position and perform a glider-like landing as opposed to a vertical landing if desired.

Tiltrotor 610 shows the rotors in a cruise position. While flying in a substantially forward direction, the tilt rotors are moved from the cruise position shown at 610 to the hover position shown at 612. With the tilt rotors in the hover position (612), the tiltrotor descends with some forward movement (at least in this example) so as to keep power use low(er) and retain better options in the case of a failure of a motor or other component (e.g., the tiltrotor can power up the rotors and pull out of the landing process or path) to position 614 until it finally lands on the ground.

Figure 7:
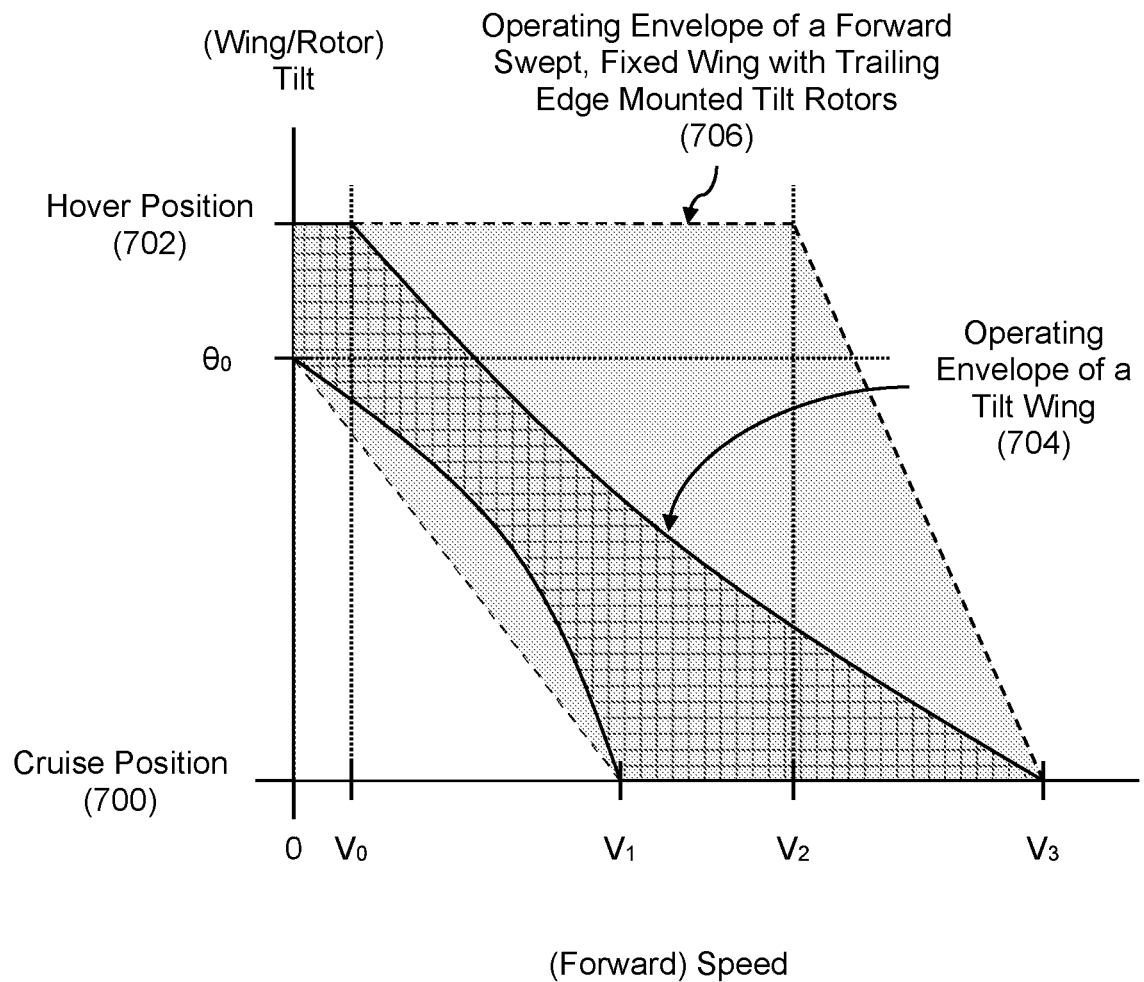
FIG. 7 is a diagram illustrating an embodiment of a velocity tilt diagram.

FIG. 7 is a diagram illustrating an embodiment of a velocity tilt diagram. In the diagram shown, the x-axis shows the forward speed of the aircraft and the y-axis shows the tilt (e.g., position or angle of the tilt wing or tilt rotors) which ranges from a (e.g., minimal) cruise position (700) to a (e.g., maximal) hover position (702).

The first operating envelope (704), shown with a solid border and filled with a grid pattern, is associated with a tilt wing aircraft. See, for example, tiltrotor 400 in FIG. 4 and tilt wing 302 and fixed rotor 300 in FIG. 3A. The second operating envelope (706), shown with a dashed border and gray fill, is associated with an (e.g., comparable) aircraft with a forward swept and fixed wing with trailing edge mounted tilt rotors. See, for example, the embodiments described above.

In the diagram shown here, the tilt rotor operating envelope (706) is a superset of the tilt wing operating envelope (704) which indicates that the former aircraft configuration is safer and/or more airworthy than the latter and is also able to fly both faster and slower at comparable tilt positions. With a fixed wing, the wing is already (and/or always) pointed in the direction of (forward) travel. When the tilt rotors are at or near the (e.g., maximal) hover position (702), the vehicle can fly pretty much all the way up to the stall speed (e.g., $V_2$) without having to tilt the motors up to cruise position. Note, for example, that the tilt rotor operating envelope (706) can stay at the (e.g., maximal) hover position (702) all the way up to $V_2$. This greatly increases the operating regime of the tilt rotor operating envelope (706) compared to the tilt wing operating envelope (704). Note for example, all of the gray area above the tilt wing operating envelope (704).

Another effect which can contribute to the expanded operating envelope for the tilt rotor configuration at or near hover position includes flow turning (see, e.g., FIG. 4). The flow turning over the main wing induces some extra lift. In some embodiments, this flow turning and its resulting lift are amplified or optimized by tilting the main wing rotors at a slight backward angle from directly down when in a normal hover (e.g., at minimal tilt position 700).

In contrast, a tilt wing presents a large frontal area when the tilt wing is tilted up in (e.g., maximal) hover position (702). As a result, tilt wings are unable to fly forward at any kind of decent speed until at or near the full (e.g., minimal) cruise position (700) or nearly so.

Early prototypes of the tiltrotor vehicle were directed to proof of concept and developing an airworthy vehicle. To that end, each propeller had a single drivetrain for simplicity. The following figures describe various embodiments of redundant drivetrain systems that may be used with the exemplary tiltrotor vehicle or other vehicles.

Figure 8A:
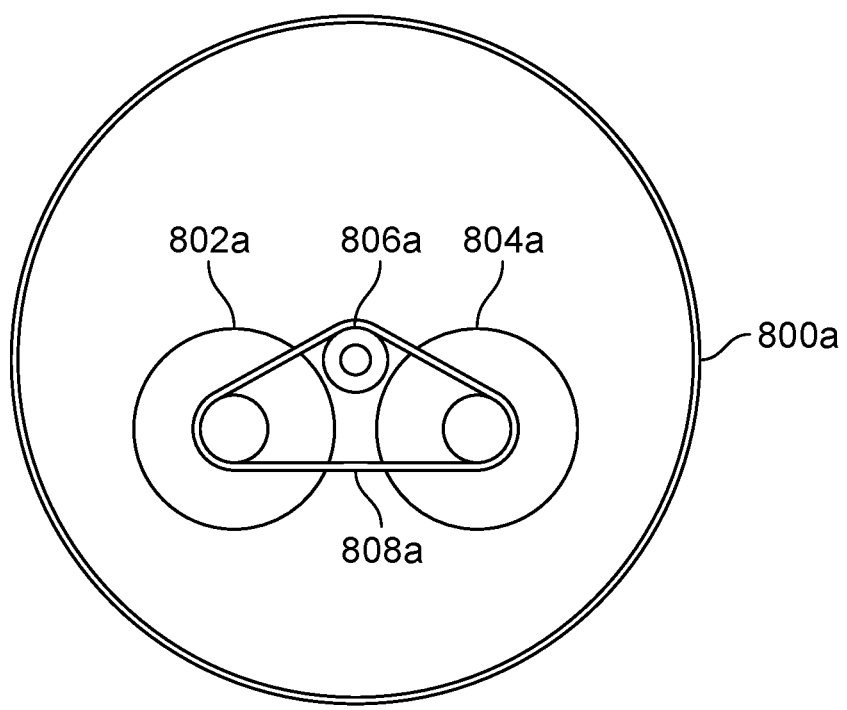
FIG. 8A is a front view diagram of an embodiment of a redundant drivetrain system with a belt-driven shaft.
Figure 8B:
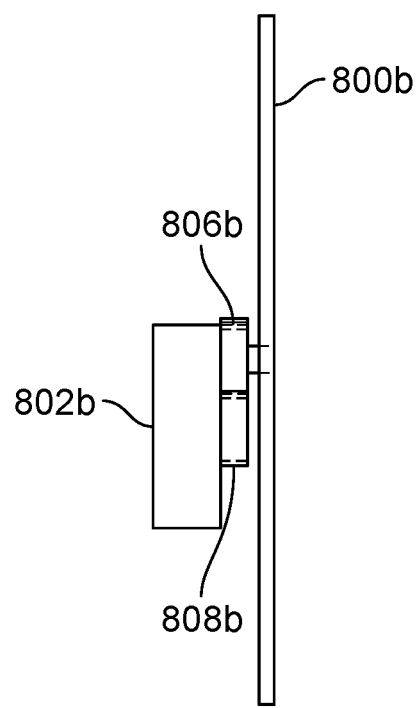
FIG. 8B is a side view diagram of an embodiment of a redundant drivetrain system with a belt-driven shaft.
Figure 8C:
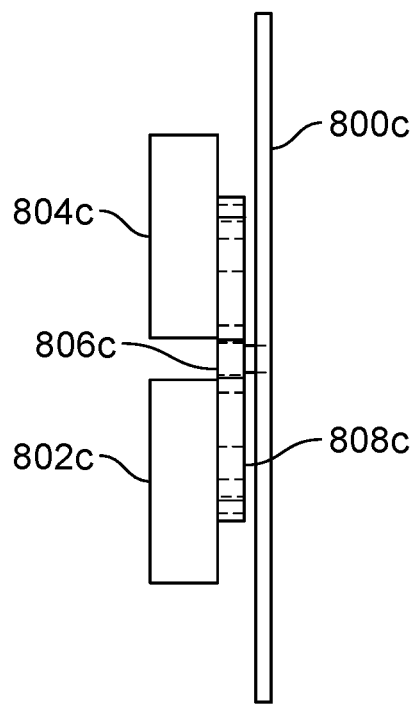
FIG. 8C is a top view diagram of an embodiment of a redundant drivetrain system with a belt-driven shaft.
Figure 8D:
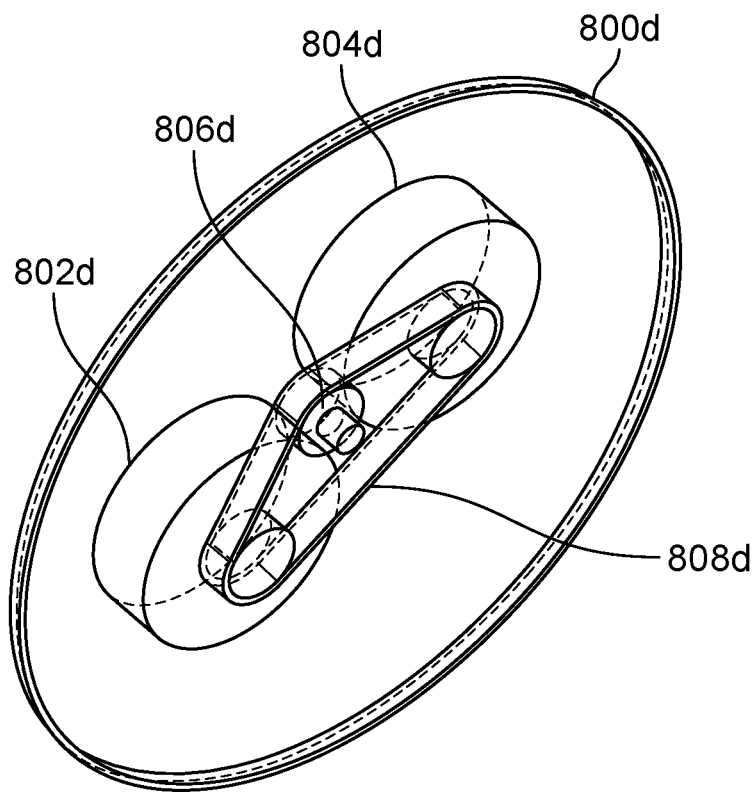
FIG. 8D is a perspective diagram of an embodiment of a redundant drivetrain system with a belt-driven shaft.

FIG. 8A is a front view diagram of an embodiment of a redundant drivetrain system with a belt-driven shaft. FIGS. 8B-8D show a side view, a top view, and a perspective view, respectively, of the same drivetrain embodiment. In the example shown, the redundant drivetrain system is used to drive the blades of the tiltrotor where the tiltrotor is coupled to a wing or canard via a fixed pylon, as described above. The rotor disc (800a-800d) is sufficiently small enough to fit within the pylon subsystem.

A first drivetrain (802a-802d), including a first motor and a first motor controller, and a second drivetrain (804a-804d), including a second motor and a second motor controller, drive a shaft (806a-806d) which holds the propeller. In this example, the two drivetrains drive the shaft via a belt (808a-808d).

With the vehicle shown in FIGS. 1A-1B, there would be a total for 16 drivetrains with the redundant drivetrain shown in FIGS. 8A-8D. If one of the 16 drivetrains were to fail, the other drivetrains would need to support 1.15 times their normal load in hover (e.g., assuming a simple control scheme the opposing unit would not be able to contribute much). Let us suppose one of the outermost motors or controllers fails on the left side of the main wing. In this case, to maintain balance, in the simplest of control schemes, the opposing rotor (i.e., the outermost rotor on the right side of the main wing), would only be able to provide as much thrust as the remaining part of the one on the left wing. If there are no redundant systems, the one on the left would provide no thrust and neither would the one on the right. With redundancy, both would be able to provide about half the regular thrust.

In contrast, with the previous powertrain architecture with a total of 8 powertrain units, if one of the power trains were to fail, the other drivetrains would need to support 1.33 times their normal load in hover. Redundant drivetrains per propeller reduce the power output required of each propeller in the event of a failure. This, in turn, permits the total mass of the (redundant) drivetrain system to be reduced, for a mass savings of ⅙ of the total drivetrain mass (e.g., since total masses are driven by failure cases). Some of this savings might be offset by increase in For context, the stack height of the motor in this example is half that of the original drivetrain architecture (e.g., with one drivetrain per propeller).

One attractive feature of a belt-driven redundant drivetrain system (as shown here) is that drivetrain failures are more benign since no rotors have to stop completely. This may make belt-driven drivetrains an acceptable choice for some applications even though belt drives are not as efficient as direct drives and the side-by-side arrangement of the motors results in a wider pylon housing which in turn increases drag. The efficiency loss (e.g., ~5% loss) and increase in drag (e.g., ~10%-15%) may be acceptable tradeoffs to have a partially driven propeller.

The uniqueness of the exemplary tiltrotor vehicle described above means that there are some specific design constraints that a redundant drivetrain system used in such a vehicle would need to satisfy. For example, the redundant drivetrain system must fit inside the pylon-mounted tiltrotors. The following figure shows a more detailed example of the pylon-mounted tiltrotors.

Figure 9:
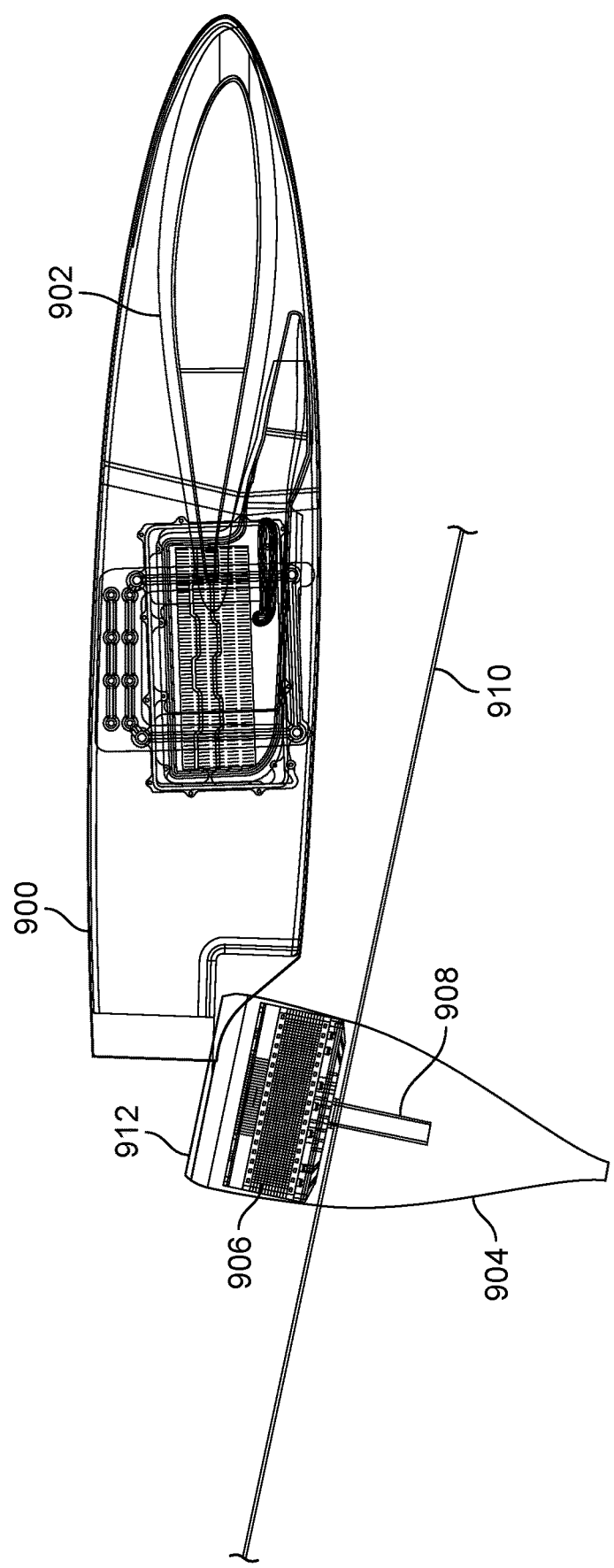
FIG. 9 is a diagram illustrating an embodiment of a pylon-mounted tiltrotor in a hovering position.

FIG. 9 is a diagram illustrating an embodiment of a pylon-mounted tiltrotor in a hovering position. In the example shown, a forward, pylon portion (900) fits around the wing or canard (902). Aft of the pylon is the tiltrotor portion (904), shown herein in the hovering position. The tiltrotor in this example is an earlier version with a single motor (906) which drives the shaft (908) and in turn the propeller blades (910). It would be desirable for a redundant drivetrain system to fit (substantially) in the existing footprint shown here, since increasing the size of the forward, pylon portion (900) or the aft, tiltrotor portion (904) would increase the surface area which in turn would increase drag. For context, the diameter of the tiltrotor (904) is 160 mm and the length from the forward surface (912) to the plane of the blades (910) is 600 mm.

In addition to the belt-drive embodiment shown in FIGS. 8A-8D, a redundant drivetrain may be implemented in variety of embodiments. The following figures show some alternatives.

Figure 10A:
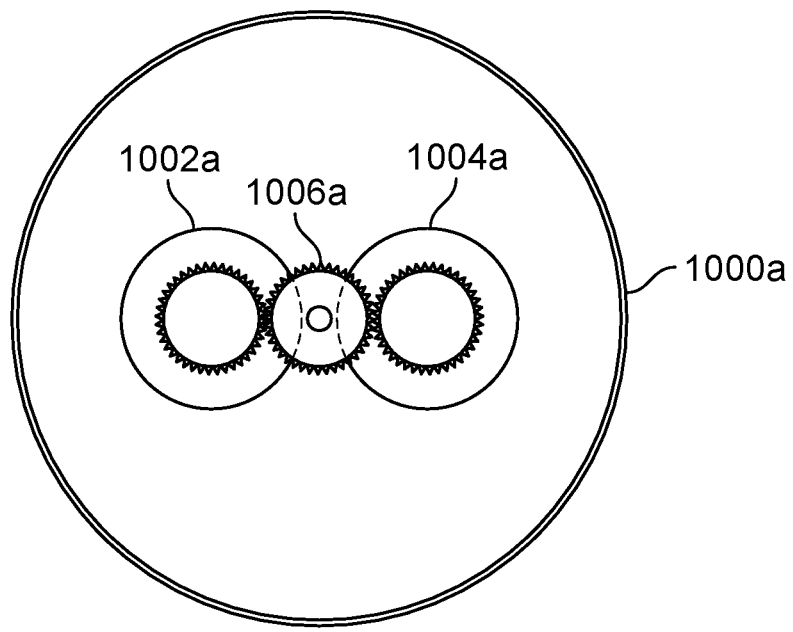
FIG. 10A is a front view diagram of an embodiment of a redundant drivetrain system configured to fit into a pylon with a gear-driven shaft.
Figure 10B:
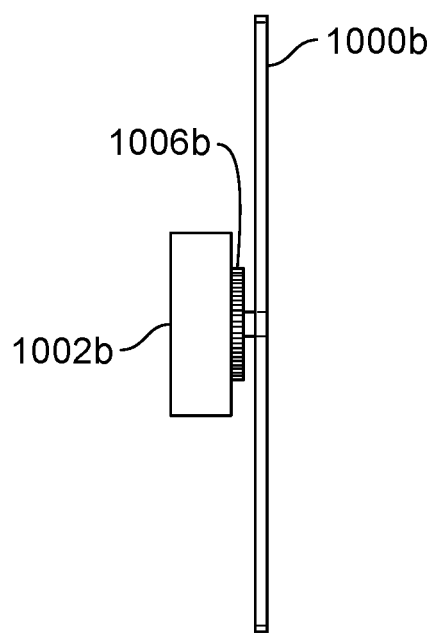
FIG. 10B is a side view diagram of an embodiment of a redundant drivetrain system configured to fit into a pylon with a gear-driven shaft.
Figure 10C:
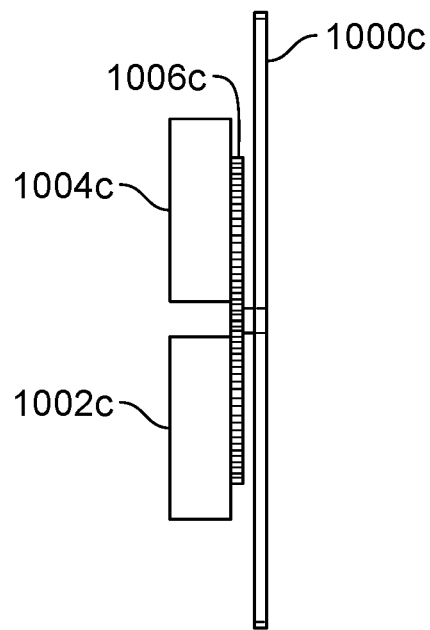
FIG. 10C is a top view diagram of an embodiment of a redundant drivetrain system configured to fit into a pylon with a gear-driven shaft.
Figure 10D:
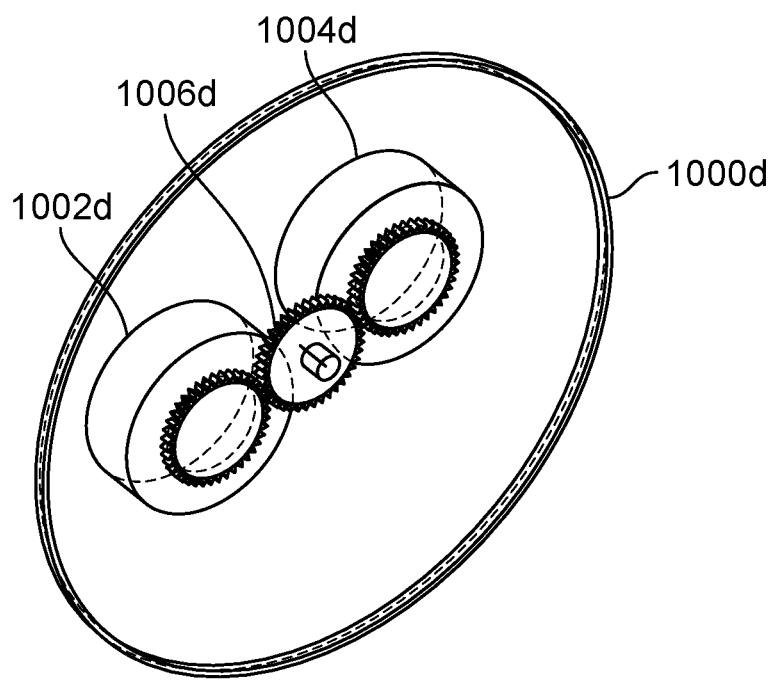
FIG. 10D is a perspective view diagram of an embodiment of a redundant drivetrain system configured to fit into a pylon with a gear-driven shaft.

FIG. 10A is a front view diagram of an embodiment of a redundant drivetrain system configured to fit into a pylon with a gear-driven shaft. FIGS. 10B-10D show a side view, a top view, and a perspective view, respectively, of the same drivetrain embodiment. As in the example of FIGS. 8A-8D, the motors are reduced in size and power output by reducing the stack height by half (e.g., compared to the original architecture with a single powertrain per propeller). Like the previous example, the components shown reside within a cylindrical space (1000a-1000d), such as a tapered, cylindrically-shaped tiltrotor that is aft of a fixed pylon portion that couples the tiltrotor to a wing or canard. A first drivetrain (1002a-1002d) and a second drivetrain (1004a-1004d) turn a gear-driven shaft (1006a-1006d) which in turn drives the propeller. In some applications, the relatively low loss in a gear-driven system (e.g., ~2% or less) may make such an embodiment attractive, even if some types of failures may prohibit the remaining and functioning drivetrains from driving the shaft via gears.

Figure 11A:
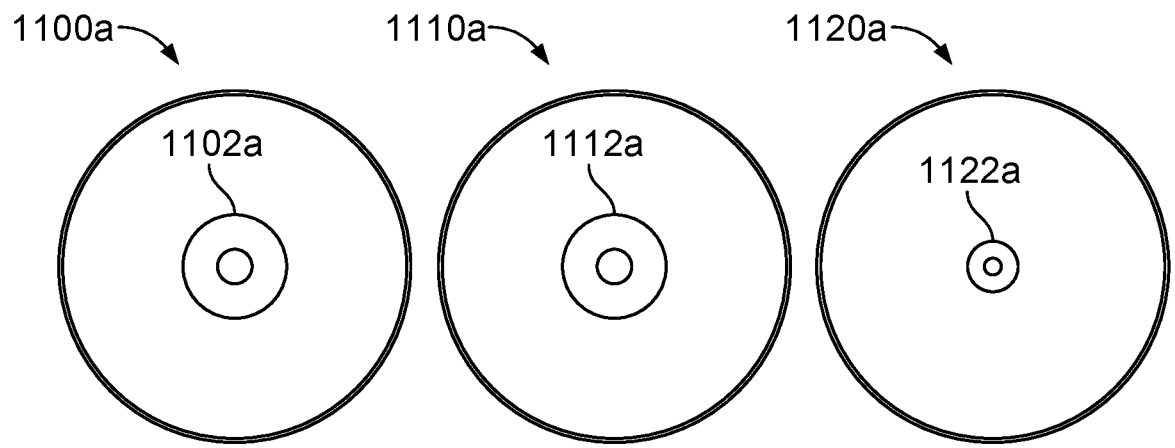
FIG. 11A is a front view diagram of embodiments of a redundant drivetrain system configured to fit into a pylon with coaxially-arranged drivetrains.
Figure 11B:
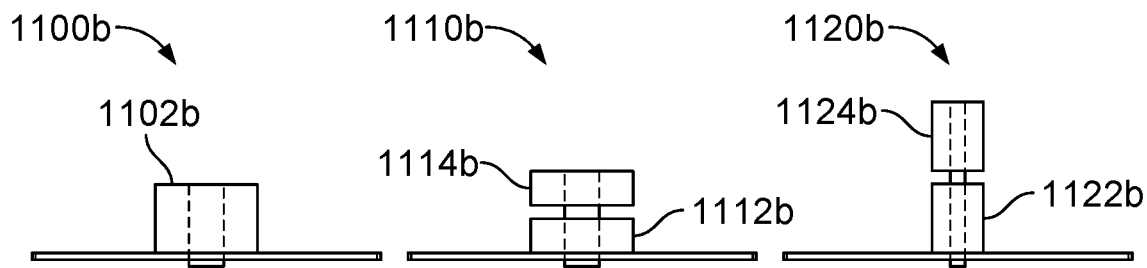
FIG. 11B is a top view diagram of embodiments of a redundant drivetrain system configured to fit into a pylon with coaxially-arranged drivetrains.
Figure 11C:
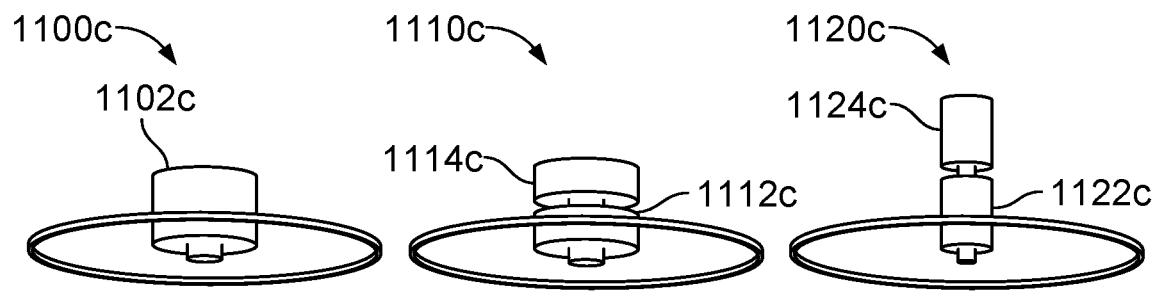
FIG. 11C is a perspective view diagram of embodiments of a redundant drivetrain system configured to fit into a pylon with coaxially-arranged drivetrains.

FIG. 11A is a front view diagram of embodiments of a redundant drivetrain system configured to fit into a pylon with coaxially-arranged drivetrains. FIGS. 11B-11C show a top view and a perspective view, respectively, of the same drivetrain embodiments.

In the examples shown here, the diagrams on the left (1100a-1100c) show a singular, non-redundant drivetrain for comparison purposes.

The center diagrams (1102a-1102c) show a redundant drivetrain embodiment with equivalent power where the motor diameter is maintained but the stack height is halved.

The diagrams on the right (1104a-1104c) show a setup where diameter is reduced and stack height is increased a bit compared to the original design (e.g., shown in diagrams 1100a-1100c). In some embodiments, this configuration is used for the side-by-side configuration (see, e.g., FIGS. 8A-8D and FIGS. 10A-10D) to reduce pylon width and thus aerodynamic drag at the expense of weight since this way of splitting motors would lead to weight increases in the overall drivetrain.

Whereas the non-redundant drivetrain (1100a-1100c) has a single drivetrain (1102a-1102c), the reduced-height redundant drivetrain example (1110a-1110c) and reduced-diameter redundant drivetrain example (1120a-1120c) both have a first drivetrain (1112a-1112c and 1122a-1122c) as well as a second drivetrain (1114b-1114c and 1124b-1124c). In some embodiments, the two drivetrain systems have completely separate electrical systems (e.g., separate batteries) where the drivetrains are arranged coaxially, with the motors turning the same shaft which in turn is connected to the propeller (blades).

With the coaxial arrangement shown here, losses due to belts or gears is eliminated. Another advantage is that since the motors are arranged along a common axis, the pylon widths stay the same and the pylon lengths are substantially the same. As a result, the (overall) drag is almost the same as the original design.

In some applications, redundant drivetrain systems are not deployed across a vehicle in a uniform and/or homogenous manner. For example, in some embodiments, only the outermost tiltrotors in the exemplary vehicle shown in FIGS. 1A-1B have redundant drivetrain systems, while the other (e.g., inboard) tiltrotors only have a single drivetrain per tiltrotor because in case of a failures, it is hardest to compensate for the outermost rotors due to the long moment arm they have in the roll orientation. Or, in some embodiments, the canard tiltrotors have coaxially-arranged, reduced-diameter redundant drivetrain systems while the other (i.e., main wing) tiltrotors have coaxially-arranged, reduced-height redundant drivetrains systems since it is easier to embed a thicker pylon into the main wing while keeping drag low rather than at the end of a skinnier canard.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   an inboard tiltrotor subsystem, including:
      an inboard pylon;
      an inboard tiltrotor; and
      a single and non-redundant drivetrain, including a single motor having a non-redundant motor height and a single motor controller; and
   an outermost tiltrotor subsystem, including:
      an outermost pylon, wherein the outermost pylon is coupled to a forward-swept and tapered wing;
      an outermost tiltrotor, wherein:
         the outermost tiltrotor has a range of motion; and
         the outermost tiltrotor is coupled to the forward-swept and tapered wing via the outermost pylon, such that the outermost tiltrotor is aft of the forward-swept and tapered wing;
      a redundant drivetrain, including a plurality of coaxially-arranged motors having a redundant motor height that is less than the non-redundant motor height associated with the single and non-redundant drivetrain in the inboard tiltrotor and a plurality of motor controllers, that drives one or more blades; and
      the one or more blades, wherein the one or more blades are forward of a center of thrust.

2. The system recited in claim 1, wherein:
   the system is included in an electric vertical takeoff and landing (eVTOL) tiltrotor vehicle.

3. The system recited in claim 1, wherein:
   the system is included in an electric vertical takeoff and landing (eVTOL) tiltrotor vehicle; and
   the eVTOL tiltrotor vehicle further includes a canard.

4. A method, comprising:
   providing an inboard tiltrotor subsystem, including:
      an inboard pylon;
      an inboard tiltrotor; and
      a single and non-redundant drivetrain, including a single motor having a non-redundant motor height and a single motor controller; and providing an outermost tiltrotor subsystem, including:
  an outermost pylon, wherein the outermost pylon is coupled to a forward-swept and tapered wing;
  an outermost tiltrotor, wherein:
    the outermost tiltrotor has a range of motion; and
    the outermost tiltrotor is coupled to the forward-swept and tapered wing via the outermost pylon, such that the outermost tiltrotor is aft of the forward-swept and tapered wing;
  a redundant drivetrain, including a plurality of coaxially-arranged motors having a redundant motor height that is less than the non-redundant motor height associated with the single and non-redundant drivetrain in the inboard tiltrotor and a plurality of motor controllers, that drives one or more blades; and
  the one or more blades, wherein the one or more blades are forward of a center of thrust.

5. The method recited in claim 4, wherein:
  the inboard tiltrotor subsystem and outermost tiltrotor subsystem are included in an electric vertical takeoff and landing (eVTOL) tiltrotor vehicle.

6. The method recited in claim 4, wherein:
  the inboard tiltrotor subsystem and outermost tiltrotor subsystem are included in an electric vertical takeoff and landing (eVTOL) tiltrotor vehicle; and
  the eVTOL tiltrotor vehicle further includes a canard.

7. The system recited in claim 1, wherein the redundant drivetrain includes a belt-driven shaft.

8. The method recited in claim 4, wherein the redundant drivetrain includes a belt-driven shaft.

9. The system recited in claim 1, wherein the redundant drivetrain includes a gear-driven shaft.

10. The method recited in claim 4, wherein the redundant drivetrain includes a gear-driven shaft.

* * * * *